Aug. 15, 1933.   S. D. LOCKE ET AL   1,922,545
AUTOMOBILE BODY
Filed March 3, 1928    5 Sheets-Sheet 3

INVENTORS
Sylvanus D. Locke
Henry J. Stegeman
BY
ATTORNEY

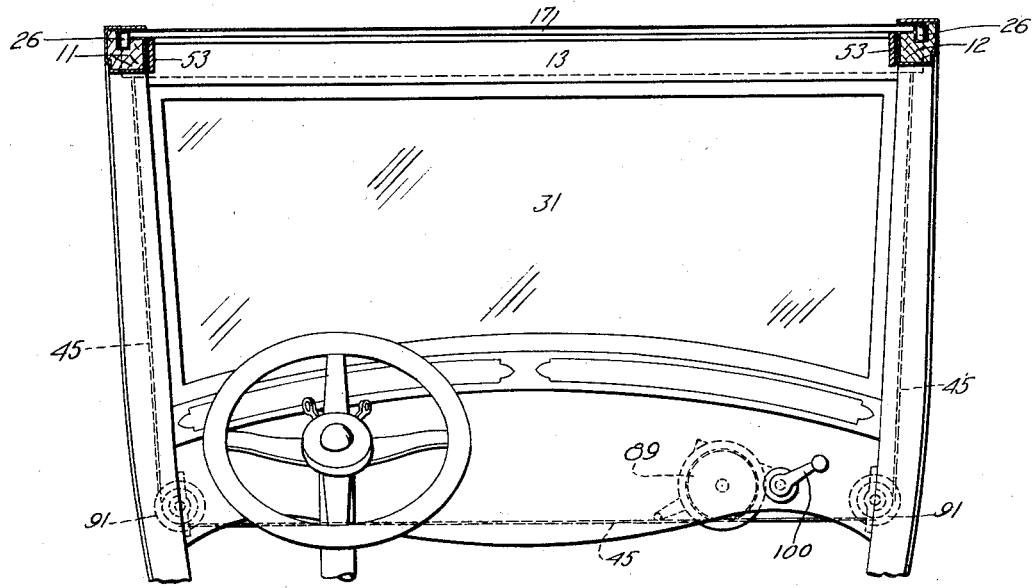
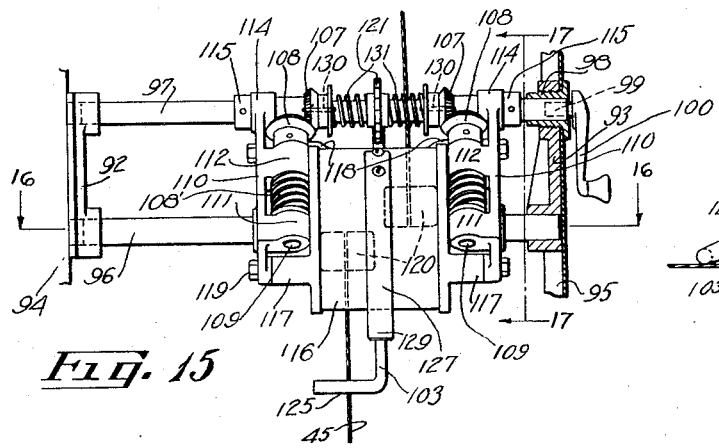
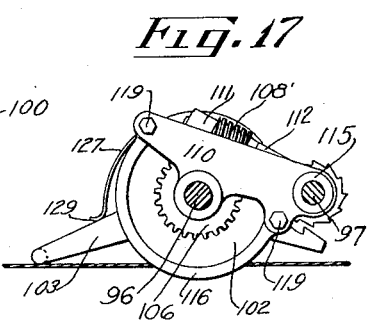
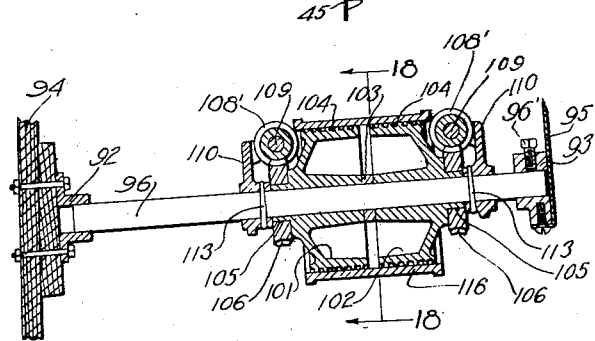
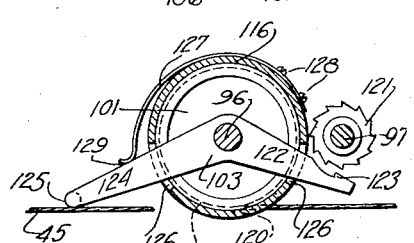

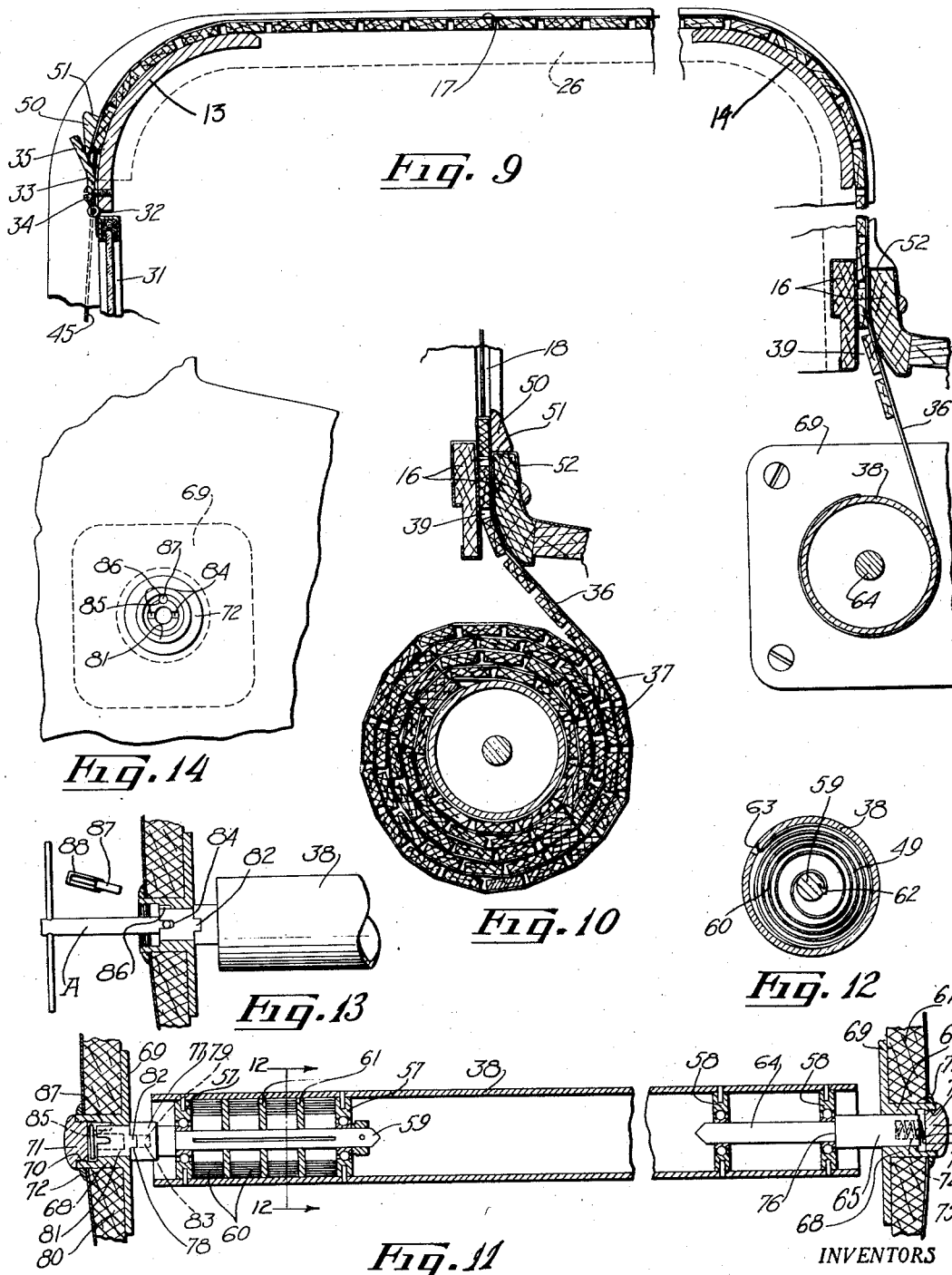

Patented Aug. 15, 1933

1,922,545

UNITED STATES PATENT OFFICE 1,922,545

AUTOMOBILE BODY

Sylvanus D. Locke, Bridgeport, and Henry J. Stegeman, Fairfield, Conn.

Application March 3, 1928. Serial No. 258,908

12 Claims. (Cl. 296—98)

This invention relates to vehicle bodies and its primary object is to provide an automobile body which may be readily and easily converted from an "open" to a "closed" type and vice versa.

An additional object is to produce an automobile body having the characteristics stated and which can be as effectively closed against the elements as the ordinary or special closed types now on the market and which may be opened to give the advantage of the "open" or touring type of body in general use.

More specific objects are to provide novel means for carrying off water and preventing it entering the interior of the car; to provide for the holding of movable parts taut and to prevent rattling; to provide novel means for operating the parts to open and close the body; to provide for the rendering of said operating means fool proof; and to provide a structure which will not detract from the appearance of or in any way interfere with the use of the machine equipped with it.

Further objects and advantages will become apparent from a consideration of the following detailed description taken in connection with the accompanying drawings showing one embodiment of the invention. However, it is to be understood that this disclosure is only by way of illustration, and is not to be considered by way of limiting the invention, for a definition of which, reference must be had to the appended claims. Changes in construction and arrangement of parts will readily suggest themselves but such changes are considered part of the invention when included within the scope of the claims referred to.

Referring to the accompanying drawings:—

Fig. 5 is an interior view looking toward the windshield;

Fig. 6 is an enlarged vertical sectional view on line 6—6 in Fig. 2;

Fig. 6a is an enlarged vertical sectional view on line 6a—6a in Fig. 2, detailing the cable guide devices and disclosing the roof as when the body is "closed";

Fig. 6b is a sectional view as on line 6b—6b in Fig. 6a;

Fig. 7 is a detail view of the forward end portion of the roof and back member;

Fig. 8 is a detail view of the cable connection to the roof and back member;

Fig. 9 is an enlarged sectional view through the body, the roof and back member being in its position of use;

Fig. 10 is a larger vertical sectional view, the roof and back member being in its position of non-use;

Fig. 11 is a somewhat smaller longitudinal sectional view of said windup roller;

Fig. 12 is an enlarged sectional view as on line 12—12 in Fig. 11;

Fig. 13 is a detail of the windup roller spring adjusting means;

Fig. 14 is an end view of the windup roller support with cap removed, as seen from the exterior of the body;

Fig. 15 is an enlarged plan view of the windlass mechanism;

Fig. 16 is a longitudinal sectional view on line 16—16 in Fig. 15;

Fig. 17 is a sectional view on line 17—17 in Fig. 15; and

Fig. 18 is a sectional view as on line 18—18 in Fig. 16.

Figure 1:
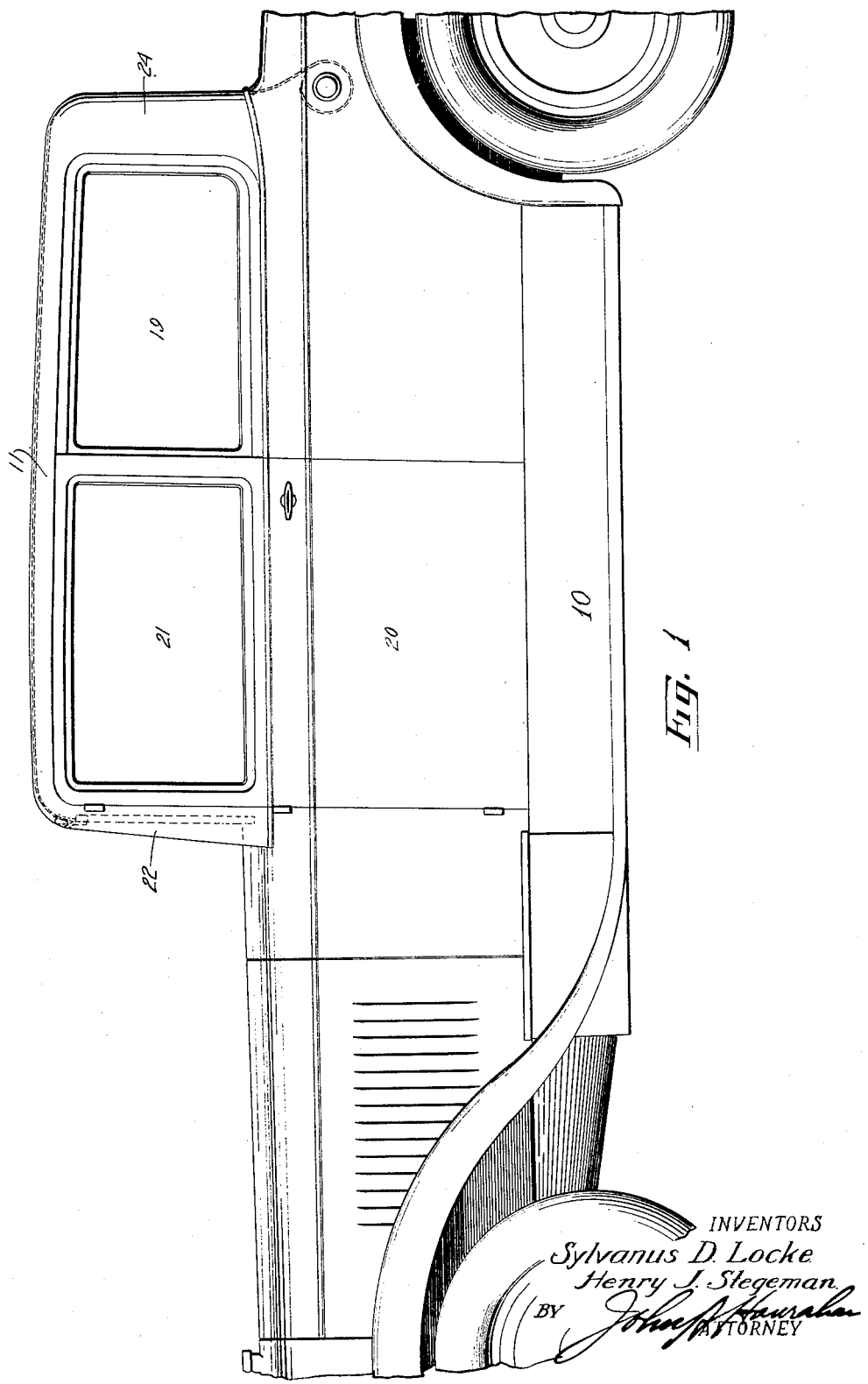
Fig. 1 is a side elevational view of an automobile equipped with a body in which the features of the invention are incorporated.
Figure 2:
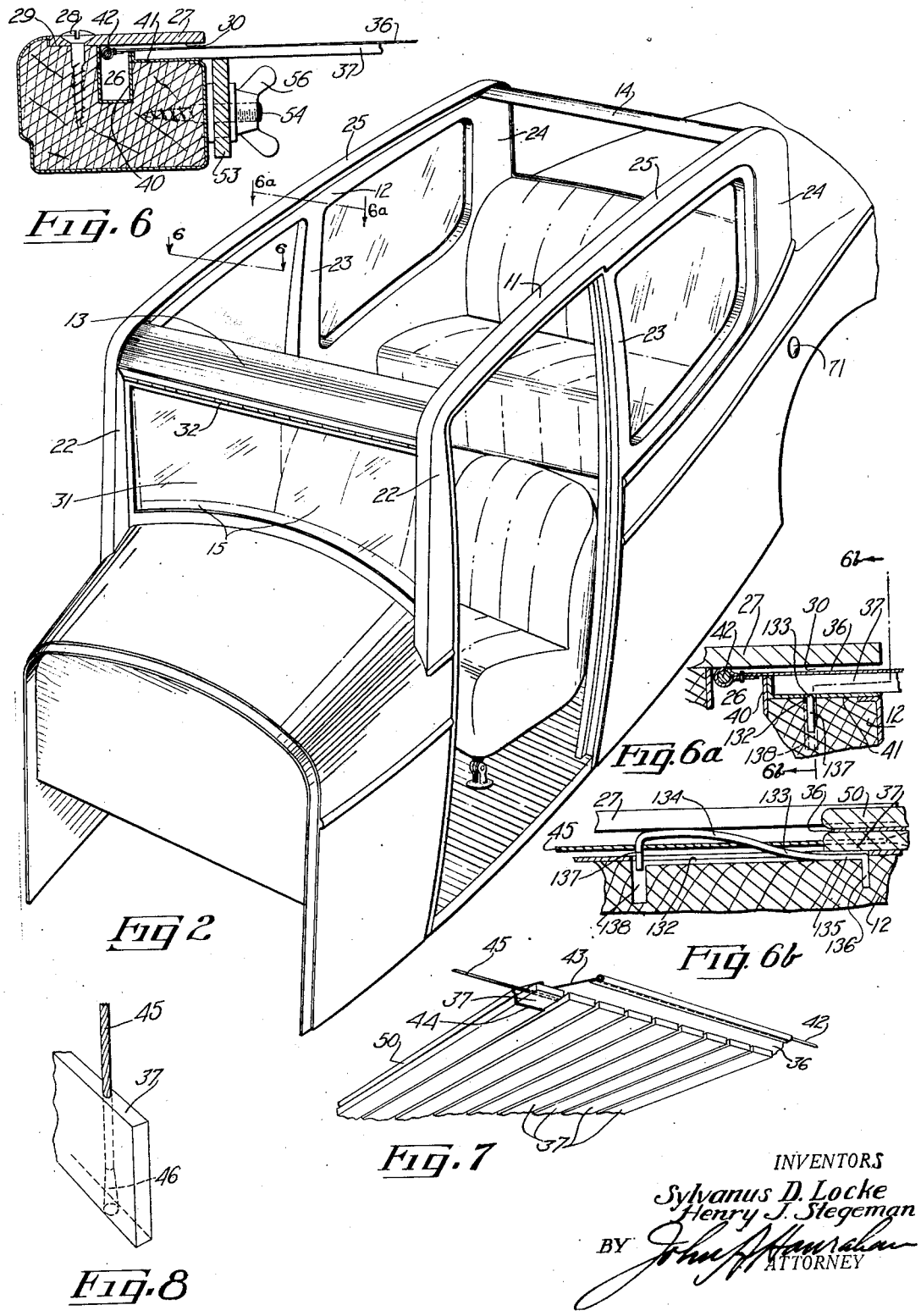
Fig. 2 is a perspective view showing the general construction of the improved body, with roof and back member and doors removed.

Having detailed reference to the drawings, 10 indicates generally an automobile equipped with the members constituting the subject matter of this invention. The body includes side frame members 11 and 12, connected at the upper front and rear portions by curved transversely extending guide and bracing members 13 and 14 respectively. At 15 is indicated the windshield of any suitable or preferred construction while at 16 is shown the construction of the rear portion of the body, including the back of the rear seat. A combined roof and back member is designated 17 and is adapted to be disposed in a housing 18 at the rear of the vehicle, when an open car is desired. The arcuate guide members 13 and 14 provide a smooth surface over which the roof and back member can readily slide when being removed to operative or inoperative position.

Each side member 11 and 12, in the embodiment shown, includes a window 19 and a door 20 provided with a glass panel 21, fitted into a structure of the body which includes front, intermediate and rear uprights 22, 23 and 24, the upper ends of the uprights being connected by a longitudinal extending beam 25. This beam is preferably horizontal, and defines the upper margin of the side members.

These side members may constitute each an integral structure, or they may consist of separate pieces assembled. A continuous water channel or trough 26 extends from adjacent the front guide member 13 to the housing 18 on each side of the vehicle, and is disposed in the beam 25, the forward upright 22, and the rear upright 24. By reference to Figs. 5, 6, 6a, 6b and 9, it will be apparent that the portion of the trough 26 within the beam 25 has its open side disposed upwardly, while the portion within the upright 22 has its open side disposed forwardly, and the portion within the rearward upright 24 has its open side disposed rearwardly. A continuous strip 27 is secured to the upper face of the beam 25, to the forward face of the upright 22, and to the rearward face of the upright 24, as by screws 28, this strip setting against the parts as indicated at 29, at the outer edge of the channel or trough 26 to define a continuous guideway 30. The continuous guide ways 30 of the two side members face each other and are adapted to slidably receive the opposite edges of the roof and back member 17.

The windshield structure 15 is disposed immediately beneath the guide member 13, and 31 refers to a windshield hinged or otherwise suitably secured as at 32, to a part of the body frame. A transverse stop 33 is secured to the forward guide member 13 as by screws 34, and is adapted to be engaged by the front end of the roof and back member, when that member is in operative position. This transverse stop includes a forwardly bent and upwardly extending part 35, providing with the member 13, a stop for the forward portion of the member 17, as probably best shown in Fig. 9.

In the disclosed embodiment, the roof and back member consists of a pliable or flexible waterproof material 36, such as canvass, leather, composition, or the like, to the inner face of which is suitably secured, spaced slats 37 of any substantial material. When not in use, the roof and back member 17 is adapted to be disposed about a windup roller 38, extending transversely of the vehicle body and mounted in the housing 18, in a manner to be fully described. To enable of such disposition of the roof and back member, the rear structure 16 is so constructed as to provide a way 39.

By reference to Fig. 6, it will be observed that the inner wall 40 of the continuous channel or trough 26, is of less height than the outer wall thereof, and that the inner portion of the beam 25 terminates below the upper edge of the walls 40, as at 41, the uprights 22 and 24 terminating in like manner, short of the outer edge of the walls 40 of the channel. The slats 37 extend from side to side of the body and have their end portions disposed upon the portions 41 of the beams 25, with their ends in close proximity to the projecting portions of the walls 41, whereby the slats are held against transverse movement. The marginal edges of the material 36 extend beyond the slats, and the edges of the inner walls 40, in about the manner shown. Preferably, the edge portions of the material 36, just beyond the slat ends, are continuous with, or in close proximity to the edges of the inner walls 40 of the channels. These marginal edges terminate just short of the outer walls of the channels or troughs, and preferably include cords 42. With this arrangement, it will be seen that the edges of the material 36 extend into the troughs 26, a short distance, to insure that the dripping points of said edges will be below the upper or outer edges of the walls 40 of the trough, to prevent seepage water from passing around the outer margin of the material 36, and back on the under side of the said material, to the interior of the body.

Secured about the front slat 37, is a forward portion of the material 36, and just back of said front slat, the cords 42 terminate. To prevent buckling or creasing of the material 36, and especially the side marginal portions thereof, during manipulation of the roof and back member the opposite marginal edges thereof are cut to extend inwardly as at 43, from the location of the cord ends; and the portions of the material surrounding and secured to the front slat 37 terminate short of the ends of that slat, as designated at 44. Since the forward guide member 13 will provide a water stoppage, it will readily be seen that the forward parts of the marginal portions of the material 36 may be cut away short of the transverse stop 33 without providing an opportunity for the entrance of water to the interior of the car.

Cables 45 are used for drawing the roof and back member to operative or closing position. These cables pass through the respective end portions of the front slat 37, and have a tapered fit therein, as shown in dotted lines at 46, in Fig. 8.

As best shown in Figures 6a and 6b, guide means are provided for maintaining the cables 45 in their proper respective positions, within the guide ways 30. To this end, grooves 132 are provided in the guide ways, and extend longitudinally of the body. Guide means for the cables are secured in said grooves, each guide member comprising a spring arm 134 resting at its end portion 135 upon the frame side member, and having its adjacent end 136 angularly disposed and imbedded in said side member. Its opposite end 137 is movable in a vertical slot 138. When the roof and back member is moved over the spring arms 134, they are depressed into the grooves 132, i. e., from the position of Fig. 6b to the position of Fig. 6a, the ends 137 moving into the slots 138. When the member 17 moves off the arms they return to the elevated position shown in Fig. 6b, between the cables 45, to maintain the cables in the guide ways 30. With these spring arms 134 at their highest elevation, the ends 137 are not removed from the slots 138, and movement of the cables toward each other is prevented, it being evident that the cables might otherwise have a tendency to move out of the guideways. The spring arms of the opposite guideways are separated a bit, a distance less than the distance between the opposite cables 45.

A basin 47 is secured within the housing 18, and has an outlet 48 for the water received within the housing, from the continuous channels or troughs 26 of the side frame members.

The windup roller 38 includes a spring 49 of the usual or any preferred construction for normally maintaining the roof and back member wound up within the housing 18, or normally tending to wind it up against the action of the roof and back member manipulating mechanism. The action of the spring insures that the back and roof member will be maintained in a taut condition, while in use. As best seen in Figs. 7 and 9, a wedge-shaped stopping bar 50 is secured to the forward end portion of the material 36, and lies snugly in the transverse seat at 35, when the car is closed. This stopping bar has a flat rearward face 51, adapted to rest upon a part of the rear structure of the body at 52, when the car is open. Owing to this arrangement, the cover and back member is held taut under spring tension to guard against rattle, whether in its position of use or in its position of non-use. Moreover, in the position of non-use of the roof and back member, the stopping bar 50 closes the way 39.

Figure 3:
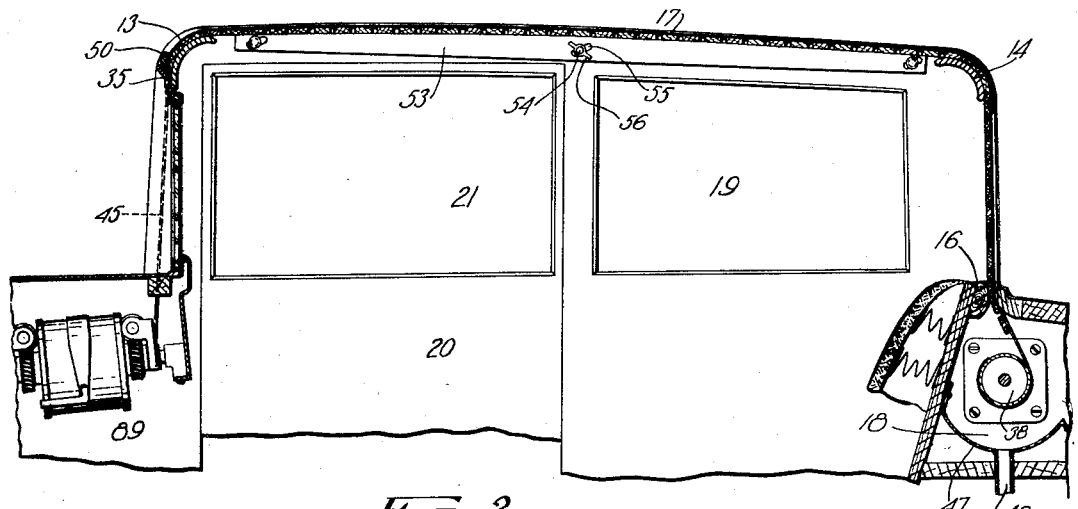
Fig. 3 is a partial longitudinal sectional view through the body.

When, in some cases, it may be found necessary or desirable, locking strips 53 are provided and may be utilized to make more certain that there will be no rattling of the roof and back member. As shown (see Figs. 3 and 6) these strips are secured upon the inner faces of the side members by means of screws 54 disposed in diagonal slots 55 in said strips, clamping nuts 56 being provided on the screws. As will be apparent, the locking strips 53 may be located on the screws and fastened by the nuts to hold the roof and back member outwardly and upwardly, or there may be separate securing connections between the strips and the slats, whereby the roof and back member may be fastened down against the surfaces 41. Obviously, similar locking strips 53, may be employed to hold the forward portion of the roof and back member adjacent the forward uprights, against movement, and the rearward portion of the roof and back member adjacent the rearward uprights against movement.

As disclosed, the windup roller 38 is in the form of a hollow cylinder having spaced bearings 57 and 58 respectively, fixed in its opposite end portions. A short shaft 59 is mounted against endwise movement in the bearings 57, and a plurality of coil springs 60 between said bearings constitute the winding spring 49 of the roller. These springs are separated by discs 61 and the opposite ends of each coil are connected to the short shaft and hollow cylinder, as shown at 62 and 63 respectively.

Spaced bearings 58, removably support a shaft 64, the outer end portion of which is mounted as at 66 in a side wall 67 of the housing 18. This wall 18 receives a tube 68 having an annular flange 69 and an internal thread 70 to receive a nut 71. The flange 69 engages the inner face of the wall, the tube passing through the wall, and the nut being received in the tube. An annular cap 72, about the outer end of the tube and against the outer face of the wall 67, insures the position of the tube in the wall. Disposed in a pocket 74 in the outer end 75 of the shaft 64 is a small coil spring 73 which engages the nut 71 and yieldingly presses an annular shoulder 76 of the shaft against the outermost bearing 58.

Shaft 59 has a portion 77 provided upon its outer end with a slot 78, and a shaft centering depression 79 at the base of said slot. The side wall 80 of the housing 18, opposite the wall 67, receives a tube 68, having an annular flange 69, and an internal thread 70 to receive a nut 71 and a cap 72 in the manner as described in connection with the wall 67. A cylindrical support 81, within the tube 68 of the wall 80 has a cross protuberance 82 upon its near end to removably fit the cross slot 78, and a centering pin 83 to removably fit the centering depression 79.

Support 81, at its outer end, is provided with a cross slot 84 and a depression 85 at its side edge complemental to an internal depression 86 of the tube 68. This support is capable of being rotated in its tube 68, by a suitable tool A of known construction adapted to engage the cross-slot 84. A pin 87 is adapted to be positioned in the complemental depressions 85 and 86, to lock the cylindrical support against rotation. This pin 87 is provided with a cap piece 88 preferably having a slot in its end to engage the pin in such a manner that the pin and cap may be positioned in alignment, as in Fig. 13, to allow ready insertion of the pin. The cap piece is adapted to be turned at right angles to the pin, as in Fig. 11, after insertion of the pin into the depressions 85 and 86.

Obviously, the pin 87 is inserted after tension has been applied to the spring, and before the tool A is removed. The nut 71 insures the position of the pin in the complemental depressions as will be plain from an inspection of Fig. 11. The mechanism for mounting the windup roller as just described, is designed largely to preclude rattling of said roller.

The rearward or lower end of the material 36 is secured to the hollow cylinder of the windup roller 38, in any convenient manner, to insure that the roof and back member may lie smoothly upon the cylinder, as shown in Fig. 10. It must be evident from the illustration and description, that the roof and back member and the windup roller are all within the normal width of the automobile body, so that the body has the appearance of the ordinary closed bodies of well-known makes.

Figure 4:
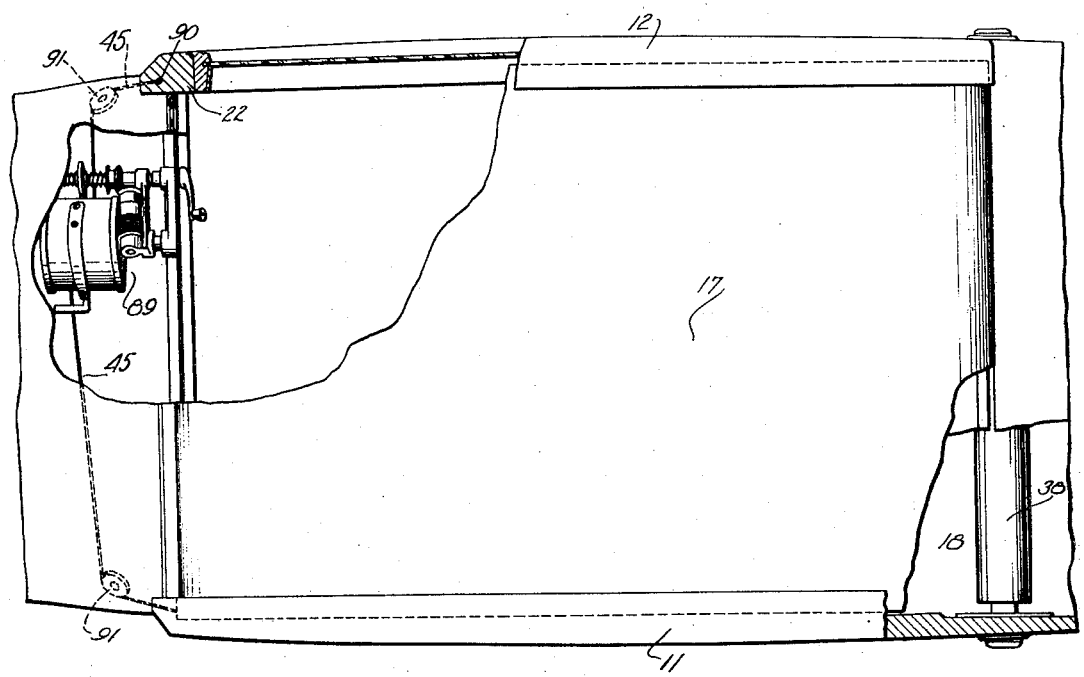
Fig. 4 is a fragmentary plan view of the body.

At the front of the body 10, below the windshield structure, mechanism is provided for manipulating the cable 45 and this mechanism may consist of a windlass represented generally at 89. The uprights 22 have guideways 90 for the cables (see Fig. 4) and any number of idlers 91, conveniently fixed upon the body frame may guide the cables 45, one adjacent each side of the body.

Referring to the windlass mechanism, 92 and 93 are brackets secured to the part 94 adjacent the front of the automobile, and to the forward face of the instrument board 95. 96 is a shaft having its opposite ends disposed in the brackets 92 and 93, one end of the shaft being fixed against turning movement as by set screw 96'. A shaft 97 spaced from and parallel with the shaft 96 has its opposite ends rotatably mounted in bearings in the brackets, the bracket 93 including a bushing 98 removably threaded therein to receive one end of the shaft 97. The inner end of the shaft 97 has an opening 99 to receive a crank 100 adapted to be operated to rotate said shaft.

Rotatably mounted on the shaft 96, are oppositely disposed winding drums 101 and 102. A lever 103 is rotatably disposed on said shaft and spaces said drums apart, the lever having an additional function, as will be explained. Each winding drum has an outer spiral groove 104 to receive a cable 45, and has fixed to it upon a small extension 105, concentric with the shaft 96, a worm wheel 106. Fixed to the shaft 97, in a manner to be explained, are a pair of oppositely disposed spaced bevel gears 107 each gear meshing with a similar gear 108 pinned or otherwise secured upon a short shaft 109 carrying a worm 108' meshing with a worm wheel 106.

The short shafts 109 are each rotatably mounted in a bracket 110, having bearings 111 and 112 therefor, the bearings 111 being near the ends of the shafts carrying the worms 108', while the bearings 112 are disposed between the worms and the bevel gears 108, the shafts being fixed against longitudinal movement in the bearings. Each bracket 110 is pinned to the shaft 96 as at 113 and is supported upon the shaft 97 as at 114, in a manner not to interfere with the rotation of said shaft. Collars 115 fixed upon the shaft 97 hold the same against longitudinal movement.

A windlass casing 116 is disposed about the drums 101 and 102 and has two extensions 117 and 118 to which the brackets 110 are secured by screw bolts 119. From this, it will be seen that the windlass casing renders the position of the bracket 110 stable, while said brackets, being pinned upon the shaft 96 fix the position of the casing about the drums. Openings 120 are provided in the casing for the passage of the cable 45 to the drums, and both cables enter the same side of the drums whereby both are similarly wound and unwound. The cable ends are secured to the drums in any ordinary or preferred manner.

Without further disclosure, it will be apparent that the turning of the crank 100 will cause the drums 101 and 102 to rotate, the direction of rotation of the drums depending upon the direction of rotation of the crank. The worm and worm wheel engagement make provision for the drums remaining in any position to which they may be turned, the windup spring of the windup roller being incapable of exerting unwinding movement through the worm and worm wheels. Consequently, the roof and back member of the body remains stable in its position of use against action of the windup roller.

The windlass mechanism includes means for automatically locking the crank 100 against turning movement, when a cable becomes slack, as, for example, when the roof and back member has reached its desired position or when, for any reason, said roof and back member gets stuck. To this end, a ratchet wheel 121, is fixed upon the shaft 97 in alignment with the lever 103. An arm 122 of the lever 103 includes a pawl 123, capable of engaging the teeth of the ratchet wheel, and the other arm 124 of said lever is normally engaged as at 125, by the cable. The arms 122 and 124 of the lever extend through slots 126 in the windlass casing 116, and the casing offers no interference with the necessary movement of said lever. Secured to the outer face of the casing 116 as at one of its ends 128, is a leaf spring 127, having its other end 129 engaging a face of the arm 124 of the lever 103.

When taut, the cable, being acted upon by the spring of the windup roller, is adapted to hold the pawl away from the teeth of the ratchet roller against the lesser pressure offered by the spring 127. However, when the cable becomes slack, the lever spring acts to throw the lever 103 about its pivot in a direction to cause the pawl to engage the ratchet teeth, as will be clear from an inspection of Figs. 15 to 18 of the drawings.

Obviously, each cable 45 might be associated with a locking mechanism as set forth, although we have preferred to disclose one of the cables adapted to cause the crank to become locked when the cable is slack. Upon again tightening the cable, the pawl is moved away from the ratchet wheel, and the crank may be used as before.

To allow for independent winding or unwinding of a cable, in order that the cables may be kept under the same tension, the bevel gears 107 are slidably keyed to the shaft 97 at 130, and coil springs 131, one between each bevel gear and the ratchet wheel 121, normally hold said bevel gears in mesh with the bevel gears 108.

All that is necessary to adjust the cables to equal tension, is to withhold one of the bevel gears out of mesh with its corresponding gear 108, against the action of a coil spring 131, and turn the crank 100, thus winding or unwinding one of the cables while leaving the other cable stationary. When said cable has been wound or unwound to have the same tension as the other cable, the withheld gear 107 is released and permitted to re-engage its corresponding gear 108.

From the foregoing description and accompanying drawings, it will be plain that the major portion of the water from rain or snow landing upon the cover member 17, will pass off either forwardly or rearwardly on the outside of the windshield structure or the outside of the back of the cover member. A certain amount of water will, however, pass off the side portions of the material 36 through the guide ways 30 into the continuous channels or trough 26. Some of the water will flow rearwardly through the channels or trough, and some will flow forwardly. That portion of the water flowing rearwardly will all be conveyed directly to the housing 18, and thence out through the drainage opening 48. That portion of the water flowing forwardly will be conducted to the portions of the channels or troughs within the uprights 22 and special passages may be provided in these forward uprights for the water flowing from the channels or troughs or the water may pass through the guide openings for the cables 45.

Since the top extends over the rear of the automobile it is not necessary to seal the same at its rear. However, the wedging action at the front when the cover is in operative position, forms a seal and the cover is partially sealed at its sides. This feature of having the removable roof or cover extend beyond the forward edge of the rearmost portion of the permanent portion of the body eliminates the occasion for a seal at the rear edge of the cover.

A perusal of the foregoing description and accompanying drawings will make clear that our mechanism for converting the body from "open" to "closed" type and from "closed" to "open" type is simple, economical and dependable, and is a structure capable of being easily and quickly to set in working condition, not likely to get out of working adjustment and including many novel features rendering it wholly satisfactory and fool-proof.

Having thus fully described our invention, what we claim as new and desire to secure by Letters Patent is:—

1. In an automobile body comprising longitudinally extending top beams each including a guideway, a removable cover for closing the space between said top beams, said cover having its edges disposed in said guide ways, cables connected with said cover for controlling the movement of the same, said cables disposed in said guide ways, and spring fingers in said guide ways adapted to prevent movement of the cables laterally of the guide ways.

2. In an automobile body including side frame members, curved transversely extending guides disposed between said side members at their forward and rear upper portions respectively, a member connected with said forward guide and forming therewith a transversely extending trough, a removable roof closing the space between said side frame members and slidable on said transversely extending guides, means for moving the roof to inoperative position, means for moving the roof to operative position, and a stopper carried by said roof and adapted to wedge in said trough, when the roof is in operative position.

3. In an automobile body including side and end frame members, a removable roof for closing the space between said members, said roof extending over one end of the body, and wedging means automatically wedged in place to seal the other end of the roof when the roof is moved to operative position.

4. In an automobile body having longitudinally extending top beams each provided with a guide way, a removable cover for closing the space between said top beams, cables connected with the cover for controlling movement of the same, said cables disposed in said guide ways, and movable means in said guide ways to prevent movement of the cables laterally out of the guide ways.

5. In an automobile body having longitudinally extending top beams each provided with a guide way, a removable cover for closing the space between said top beams, said cover having its edges disposed in said guide ways, cables connected with said cover for controlling the movement of the same, said cables disposed in said guide ways, means in the guide ways to prevent movement of the cables laterally out of the guide ways, said means being movable out of the path of the cover as it is moved in the guide ways.

6. In an automobile body, side members having guide ways including rigid top portions, a removable cover for closing the space between said side members, said cover including slats arranged transversely of the cover, the edges of said cover disposed in said guide ways, and means within the body and shiftable independent of the guideways and engaging the slatted portion of the cover and vertically shiftable for securing said cover with its edges locked against the under side of the rigid top portions of the guide ways to provide a seal.

7. In an automobile body including longitudinally extending side beams each provided with a fixed longitudinally extending open sided guide way having a rigid immovable top portion, a removable cover for closing the space between said beams, said cover having its edges entering the open sides of and disposed in said guide ways, rigid longitudinally extending members at the inner side of the body secured to said side beams for vertical adjustment relative thereto, and means within the body and operable to secure said members in elevated position maintaining the cover in engagement with the under side of the rigid immovable top portion of the guide way whereby to prevent rattle and form a seal.

8. In an automobile body including side frame members, a removable roof closing the space between said side frame members, a trough connecting said side frame members, and a stopper carried by said roof and adapted to wedge in said trough when the roof is in operative position to form a water-tight joint.

9. In an automobile body including side frame members, a transversely extending member disposed between the side members at their forward portion, a member connected with said member and forming therewith a transversely extending trough, a removable roof closing the space between said side frame members and slideable on said transversely extending member, and a stopper carried by the roof at its forward edge and adapted to wedge in said trough, when the roof is in operative position.

10. In an automobile body including longitudinally extending top beams disposed one at each side of the body, a guide way in each of said top beams, a removable cover for closing the space between said top beams, said cover having its edges disposed in said guide ways, channels in said guide ways adapted to receive water from the edges of the cover, said channels having inner and outer walls, said cover having its edge portions disposed between said walls of the channels, the edge portions of said cover within the channels being flexible, and means holding said edge portions downwardly in the channels whereby to maintain the drip point of the edges below the upper edges of the inner walls of the channels to prevent water passing about said edges and along the underside of the cover to the interior of the body.

11. In an automobile body including longitudinally extending top beams disposed one at each side of the body, a guide way on each of said top beams, a removable cover for closing the space between said top beams, said cover having flexible edge portions and having said edge portions entering said guideways, channels in said guideways adapted to receive water from the edges of the cover, said channels having inner and outer walls, said cover having its edge portions disposed between said walls of the channels, longitudinally extending strengthening members enclosed by the edge portions of the cover and enlarging the same, said enlarged edge portions of the cover disposed entirely between said walls of the channels, and said enlarged edge portions engaging the underside of the top of the channel whereby the edge portions are held against upward movement to maintain their drip point below the upper edges of the inner walls of the channels whereby to prevent water passing about said edges and along the underside of the cover to the interior of the body.

12. In an automobile body including longitudinally extending top beams disposed one at each side of the body, a guideway opening laterally through each of said side beams and said guide way of one beam facing the guide way of the opposite beam, a removable cover for closing the space between said top beams, said cover having flexible edge portions and having said edge portions disposed in the guideways, channels in said guideways adapted to receive water from the edges of the cover, said channels having inner and outer walls and said inner walls terminating substantially flush with the lower edges of said lateral openings to the guideways, said cover having its edge portions disposed between said walls of the channels, and the edge portions of the cover within the guide way and channels being thicker than the height of the laterally opening guide ways whereby said edge portion must have their drip point disposed below the upper edges of the inner walls of the channels whereby to prevent water passing about said edges and along the underside of the cover to the interior of the body.

SYLVANUS D. LOCKE.
HENRY J. STEGEMAN.